United States Patent Office 3,232,434
Patented Feb. 1, 1966

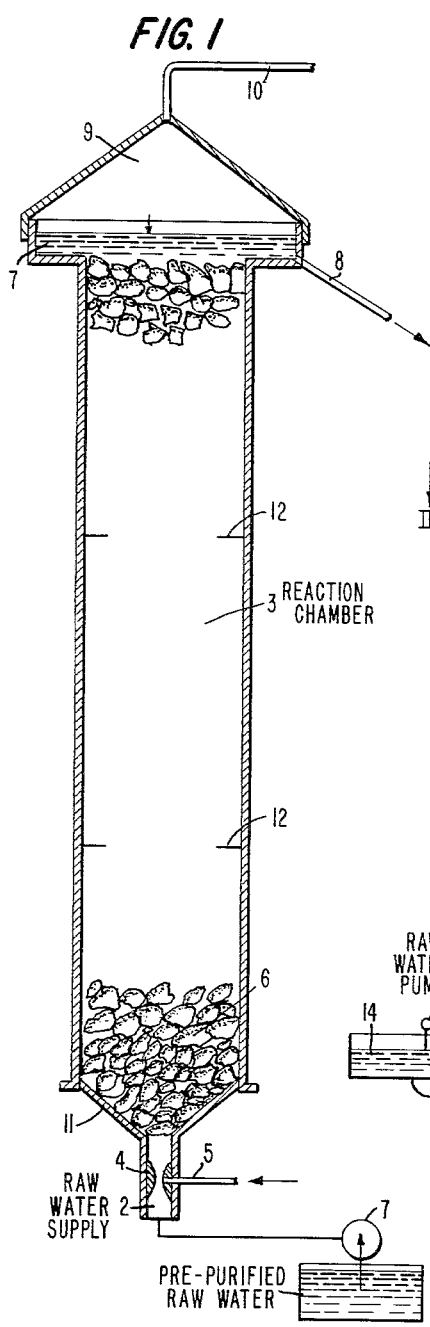
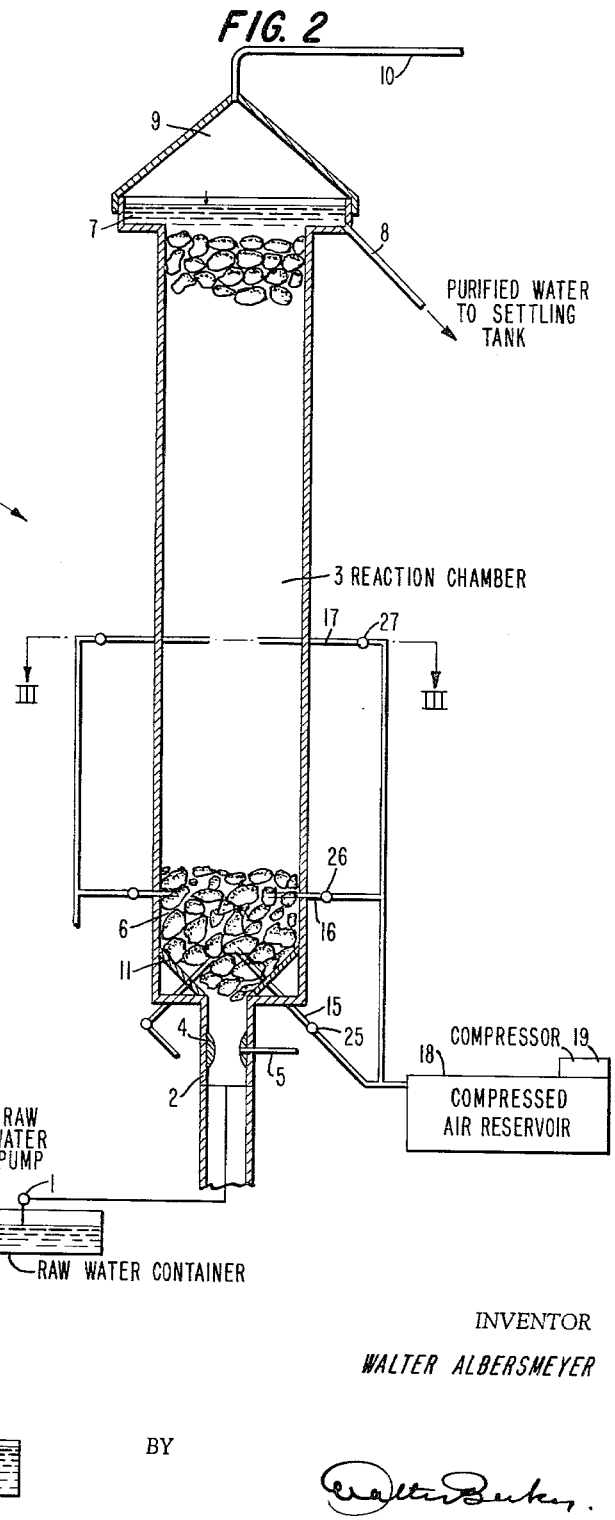

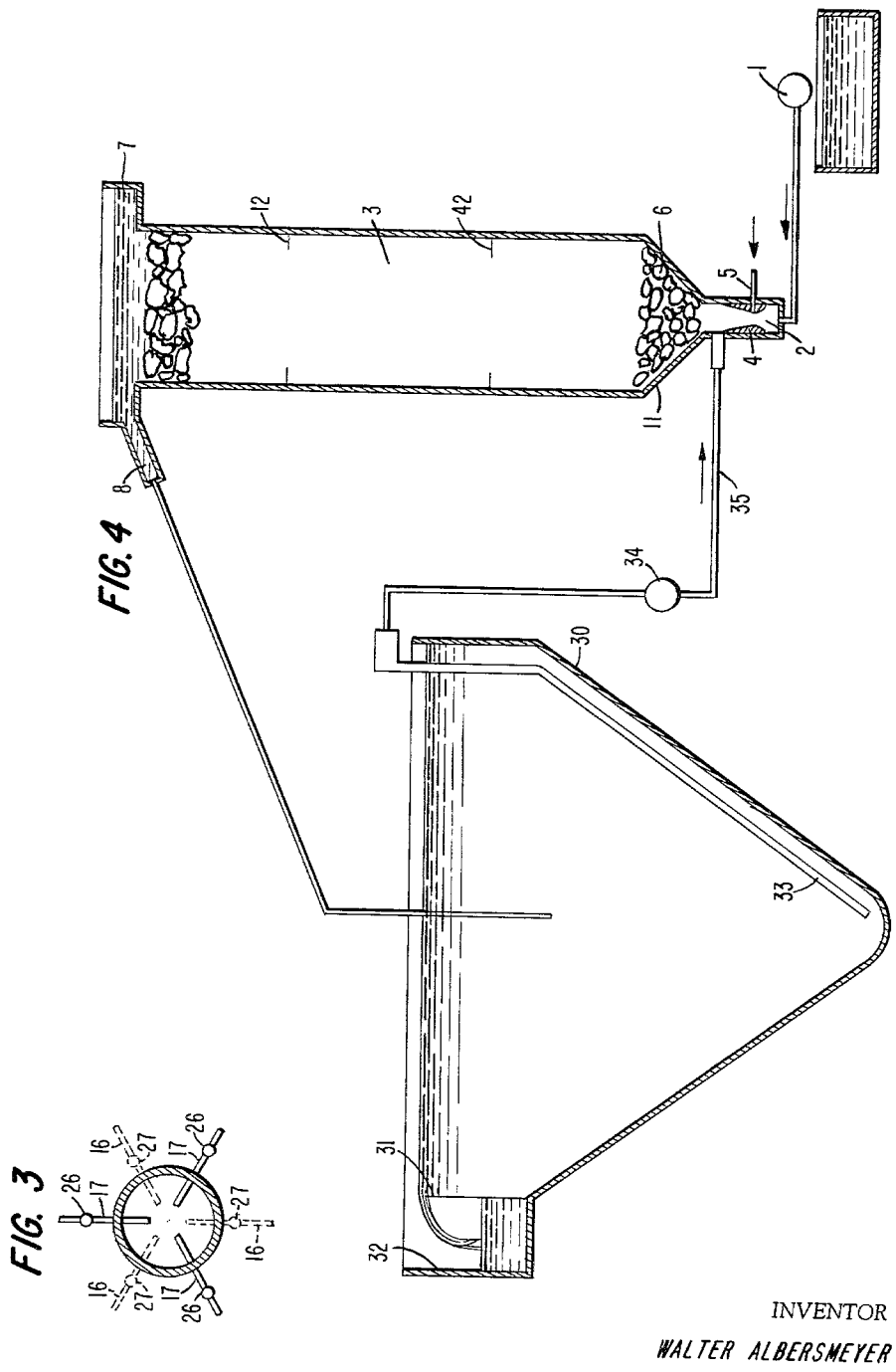

3,232,434
DEVICE FOR PURIFYING WASTE WATERS
Walter Albersmeyer, Gummersbach, Rhineland, Germany, assignor to L. & C. Steinmüller G.m.b.H., Gummersbach, Rhineland, Germany
Filed Sept. 5, 1962, Ser. No. 221,946
Claims priority, application Germany, Sept. 21, 1960, A 35,620; Sept. 14, 1961, A 38,329
4 Claims. (Cl. 210—151)

The present application is a continuation-in-part application of my co-pending application Ser. No. 139,122, filed September 19, 1961, now abandoned.

The present invention relates to an apparatus for purifying industrial and domestic waste waters fully biologically. Devices for fully biologically purifying domestic and industrial waste waters exist in the form of drop bodies or trickling filters, immersion bodies, activated sludge installations and oxidation ditches. Drop bodies are hollow containers which are filled with a filler, mostly lava slag or coke. The waste water to be purified is substantially uniformly distributed by means of a rotatable sprinkler over the surface of such drop body, and the thus distributed water will, on its way through said body, be purified by the biological layer forming on the fillers, so that the ingredients of said waste water will be disintegrated or decomposed. The air supply is effected in the direction from the bottom upwards by forming a vacuum in the space above the fillers, by flue effect when tower-like drop bodies are employed.

Immersion bodies consist of a great number of thin discs mounted on a shaft adjacent to each other in slightly spaced relationship with regard to each other. A biological layer forms on the said discs. These rotating discs immerse in a container with the waste water to be purified. The contact of the layer-covered discs with the waste waters brings about the purification of the latter. By adjusting the depth of immersion of said discs, the contact period of the discs with the waste water and the air, may be faried. Immersion bodies have, however, up to the present time, scarcely found general employment in practice.

Activated sludge installations are, as a rule, rectangular containers or basins in which the air supply is effected by constant sludge concentration and de-airing by means of paddle wheels, filler plates or perforated tubes. The constancy of the sludge concentration is obtained by sludge withdrawal and feeding. The waste water purification is effected by the microbe-covered flakes of the activated sludge.

In oxidation ditches which represent a simplified activated sludge method, the waste water is, in conformity with the shape of the ditch, circulated along a circular or oval path. The movement of the waste water in the ditch is effected by so-called de-airing rollers which, at the same time, take care of an optimum oxygen supply. The purification of the waste water is effected by oxidation and biological disintegration. For purposes of a proper waste water purification, the biological methods are indispensable inasmuch as most waste water ingredients dissolved in the water can be removed economically only by biological disintegration.

The heretofore practiced biological purification may, aside from various variations, generally be based on two methods:

(A) The drop body method, and
(B) The activated sludge method.

Both methods have important drawbacks, as will presently appear.

The purification of waste waters on drop bodies depends on a minimum feed quantity. If the quantity is less than said minimum quantity, a functional disturbance with a complete dieing-off of the integration output will occur. When overloading the drop body, a clogging occurs so that the air supply will be interrupted and the body will be clogged up.

Inasmuch as a drop body also has to disintegrate the organic ingredients of the respective portion of the biological layer dieing due to age, an additional disintegration output is required, which will be lost for the waste water to be purified.

With drop bodies, the air supply is insufficient, in most instances, with regard to an optimum disintegration output.

Inasmuch as with biological purification methods primarily aerobic processes are involved, frequently in a drop body, more oxygen is required than is available. The oxygen supply is subjected to considerable fluctuations during the day in view of changing temperatures and air pressure influences. These fluctuations harmfully affect the respective disintegration output.

Drop bodies are sensitive to temperature drops. With temperatures below the freezing point, there exists the danger of icing, with all consequences inherent thereto. A discontinuous feeding of a drop body, which may be necessary in case of a non-uniform raw water supply, is not possible. Consequently, a drop body is limited to the continuous supply of a minimum of raw water.

A cleaning of clogged-up or not fully working drop bodies can be effected only by a complete removal of the filling body or by rinsing with hypochloride liquor. The required work is considerable and the drop body will stand idle for a long time.

The purification of waste waters by means of the activated sludge method requires a relatively high output of energy to be used for the artificial supply of air and the optimum movement in the activating basin. The exploitation of the air is relatively low with regard to the required energy.

The space requirement and the cost of installation are, due to the required large units, great per output because relatively long stoppage times of from four to eight hours are required.

It is, therefore, an object of the present invention to provide a method of and apparatus for fully biologically purifying waste waters, which will overcome the above-mentioned drawbacks.

It is another object of this invention to provide a method of and apparatus for fully biologically purifying waste waters, which will require no minimum feeding quantity and will have a wide range of controlling the water supply.

It is also an object of the present invention to provide an improved method of fully biologically purifying domestic and industrial waste waters, which method will be highly reliable and effective in any normal temperature conditions.

It is still another object of this invention to provide a method of and device for fully biologically purifying waste waters, which will assure that even under high load sufficient air will be introduced into the purifying tower to cover the required quantity of oxygen.

These and other objects and advantages of the invention will appear more clearly from the following specification in connection with the accompanying drawings, in which:

FIG. 1 diagrammatically illustrates an apparatus for purifying waste waters in conformity with the present invention.

FIG. 2 represents a vertical section through a modified apparatus according to the invention.

FIG. 3 represents a cross section taken along the line III—III of FIG. 2.

FIG. 4 is a somewhat diagrammatic cross section showing the tower with a sedimentation tank.

The apparatus according to the present invention is characterized primarily in that contrary to the heretofore known methods the raw waste waters to be purified enter a purification tower at the bottom and pass through said tower from the bottom to the top. For purposes of controlling the speed of passing through said tower, the feeding conduit for the raw water may have inserted therein a raw water pump which takes care of the feeding of the raw water. The oxygen of the air is preferably added in excess in order to make sure that at all points of the purification tower there will be available sufficient oxygen for acting upon the raw water to be treated.

However, under particularly high loads, it may occur that the drawn in quantity of air is not any longer sufficient to cover the total oxygen requirement of the waste water. In such an instance the disintegration or separation of the waste water components may stop at that portion of the tower where the oxygen has been consumed. In order to meet also the just mentioned situation, according to a further development of the present invention, the air is not drawn in to the purification tower by the waste water flow only but is also introduced as compressed air simultaneously with the waste water flow from the bottom into the reaction chamber.

More specifically, with reference to the drawings, the apparatus shown in FIG. 1 comprises a reaction chamber 3 in form of a cylindrical tower. This tower is filled with lava slag 6 of different granular size. Centrally leading into the bottom of the tower is a tube 2 for conveying the raw water. A raw water pump 1 serves for feeding the raw water. Arranged at the lower end of the tower directly above the point where the tube 2 leads into the tower, there is provided a funnel-shaped broadened section 11 on which the filling 6 rests. The upper end of the tower broadens in a trough-like manner. The thus created trough is designated with the reference numeral 7 and has connected thereto a discharge pipe 8 from which the purified water may flow into a settling tank where the separated biological sludge will settle. If the waste water has a high detergent content, a cone-shaped roof 9 may be placed upon the upper portion of the turret 3. In such instance, as shown in FIG. 1, a pipe 10 is connected to the top of roof 9, through which pipe the foamed-out detergents may be withdrawn. The pipe line 2 has a nozzle-like restriction 4 into which an air supply pipe 5 leads.

FIG. 4 shows the tank without a roof, although the cone-shaped roof could be disposed above the tank to confine the detergent foam and to permit it to be drawn off where the foam represented a problem. The arrangement of FIG. 4 is the same as that of FIGS. 1 and 2 except that FIG. 4 shows that conduit 8 delivers to a sedimentation tank 30 which overflows clean water over a barrier wall 31 to a trough 32. Extending down into the bottom of the cone-shaped sedimentation tank 30 is a sludge pipe 33 leading to the suction side of a sludge pump 34, the discharge side of which is connected by conduit 35 with tube 2 downstream from the restriction 4. Conduits 8, 33 and 35 form a connection from the top of the tower to the bottom inlet whereby a portion of the sludge from the upper portion of the tower is returned to the incoming waste water.

The operation of the arrangement is as follows: The mechanically prepurified raw waste water is, by means of a raw water pump 1, drawn in and pumped through pipe 2 into the purifying tower 3. When passing through the feeding pipe 2, the water also passes through the restriction 4 whereby its speed will, at corresponding points, be increased while the pressure at the narrowest portion of said restriction will be reduced to such an extent that air will be drawn in from the outside through pipe 5 and likewise pass into the purifying tower 3. The raw water rises in the purifying tower and the waste water will, by disintegration of the ingredients, be purified by the biological layer forming on the filling substance. When air is drawn in through pipe 5 in sufficient quantity, sufficient oxygen will be present at all portions of the tower for the biological effect upon the waste water. In order to prevent an air layer from rising along the outer wall without taking part in the reaction, it may be advantageous, at spaced points of the wall, to provide inwardly protruding sheet metal sections or the like 12, by means of which the air will always be guided back into the interior of the column of filling bodies.

In some instances, it may be advantageous in this connection to return a portion of the activated sludge arrived at the top into the feed line 2 for the raw waste water. However, in order to prevent the restriction of the feed pipe from clogging up, it is advantageous to cause this return line to lead into the feeding line above said restriction, i.e. when looking in the flow direction of the waste water, behind said restriction.

The invention described so far has over the heretofore known methods primarily the following advantages.

(a) No minimum feed quantity is required any longer.
(b) The control of the raw water feed extends from zero to the admissible maximum load.
(c) A decrease or stoppage in the disintegration process is not possible by low loads.
(d) A clogging-up in view of overload will not be possible because the tower has a self-purifying effect.
(e) A stoppage of the air supply in view of clogging-up will not occur.
(f) No additional disintegration output is required because the dieing sludge will be thrown off.
(g) There will always be assured the optimum supply of oxygen regardless of temperature and air pressure conditions.
(h) Drops in temperature have no disadvantageous effects, because the contents of the tower represents a coherent water column which, on the basis of poor heat conductivity of the water, is subjected to slow changes in temperature only.
(i) In view of the upwardly bubbling air bubbles, the water movement in the tower is such that no freezing will occur so that the tower will also function properly in severe winters.
(j) By mixing the raw water to be purified with a portion of the withdrawn activated sludge, the sludge quantity in the tower and thereby the disintegration output, is adapted to be easily controlled.
(k) The required energy is relatively low.
(l) Short treatment periods and high purifying effect at low space requirements make possible small units.
(m) There exists the possibility of designing portable units of any desired dimensions.
(n) Any purification of the tower which might become necessary is easily and quickly effected by means of pure water without destroying the biological layer or deposit.

As indicated above, under very high loads it may occur that with the above described arrangement the drawn in quantity of air will not be sufficient any longer to cover the oxygen requirement of the waste water. Therefore, in order efficiently to carry out the method according to the invention, in this instance the air is drawn in not only by the waste water flow but also as compressed air together with the waste water flow and is introduced from the bottom into the reaction chamber.

The introduction of the compressed air will produce a turbulence in the rising raw water flow. This turbulence is advantageous because it brings about a good intermixture of waste water and air and thus an optimum solution of the oxygen of the air in the waste water. If, however, the output is increased further, the turbulence will bring about that a portion of the bacteria will be pulled upwardly and will thus be lost for their exploitation in the reaction chamber. The purifying tower can according to a further development of the invention be increased considerably when additionally air is introduced successively in a plurality of stages. This can be obtained by causing a portion of the air to enter the reaction chamber with the raw water through the bottom of the tower, while further reaction air is introduced into the tower through pipes entering said tower from the side at different levels. It is advantageous not to wait with the addition of fresh reaction air until the oxygen has been completely consumed, but it is preferable to add the fresh reaction air already prior to the consumption of the oxygen. For carrying out this method, in addition to the reaction cylinder, an air reservoir or air chamber may be provided which will furnish an air flow of approximately uniform pressure and which will be charged from time to time by a compressor. From this air reservoir, a conduit leads to a nozzle which leads from the bottom of the tower into the reaction chamber. This nozzle may be combined with the inlet connection for the raw water so as to form a double nozzle composed of concentric pipes. Further conduits lead to the additional air nozzles which extend at different levels from the outside into the cylinder or tower. When arranging these additional nozzles, it is to be borne in mind that the oxygen consumption of the raw water will drop with decreasing concentration of its components. Therefore, the added oxygen will at the same speed of flow in that portion of the reaction in which the concentration of the waste water components is still high be consumed already after a shorter distance than in the adjacent portion of lower concentration of the said components. The distance of the air inlet planes increases therefore in the direction from the bottom to the top of the tower.

It should also be taken into consideration that the hydrostatic pressure of the waste water column decreases in the direction from the top to the bottom. In order to maintain the quantity of the inflowing air substantially uniform, it is, therefore, necessary that the air pressure prevailing in the nozzles is adapted to the hydrostatic pressure. This is effected by chokes or the like which are arranged in the feeding lines.

It is not advantageous to introduce the nozzles for the additional air into the cylinder as individual nozzles. It has rather proved preferable uniformly to distribute the nozzles over the circumference of the cylinder and to make said nozzles extend to a certain extent into the interior of the cylinder. Furthermore, for compensating for possible irregularities caused by the formation of stresses, strings, strands or the like, the additional air nozzles of two superimposed planes are offset with regard to each other.

Referring now to FIGS. 2 and 3, the arrangement shown therein comprises a cylindrical tower with a reaction chamber 3. The tower is closed by a funnel-shaped bottom 11 and has its upper end broadened out into a portion 7. Connected to the interior of the broadened portion 7 is a conduit 8 through which the separated raw water flows into a settling tank (not shown). If the raw water has a high detergent content, the upper portion of the tower 3 may be covered by a conical roof 9 the top of which has connected thereto a conduit 10 through which the foamed out detergent may be withdrawn.

The reaction chamber 3 is filled with lava slag 6 of different granular size. A conduit 2 for introducing the raw water leads centrally into the bottom of the tower. The raw water is by means of a raw water pump 1 drawn from a container 14 and is fed into the reactor through a conduit 2. Conduit 2 is provided with a restriction 4 serving for reducing the pressure. At this spot a pipe 5 leads into conduit 2 for drawing in fresh air.

For purposes of supplementing the drawn in air, conduits 15 are mounted in the bottom 11 through which conduits additional air may pass into the reaction chamber 3. For the same purpose there are provided air conduits 16 and 17 which lead into the cylinder at different levels. All of the air conduits are fed by a compressed air containing reservoir 18 which is charged by a compressor 19 from time to time.

In order at different levels to obtain a good distribution of the air introduced into the reaction chamber, the conduits are, as evident from FIG. 3, uniformly distributed over the circumference of the tower and additionally the conduits are offset with regard to each other at different levels. Inasmuch as the reaction tower is filled with a water column, the pressures to be overcome by the air during the entrance of the latter into the reaction chamber will vary depending on the water column thereabove. For purposes of equalizing these differences in pressure, the conduits have interposed therein throttles or chokes 25, 26 and 27. These throttles make it possible to adjust the air pressure so that it will be uniform at all levels.

In operation, the mechanically prepurified raw waste water is drawn in by the waste water pump 1 and through conduit 2 is piped into the purifying tower 3. When passing through conduit 2, the raw waste water also passes through the construction 4 whereby the speed will be increased spotwise whereas the pressure at the narrowest point of said construction will be reduced to such an extent that air will be drawn in from the outside through pipe 5. This air will also pass into the purifying tower 3. The raw waste water rises in the purifying tower while the waste water will by means of the biological layer forming on the filling material be purified by decomposing or disintegrating the components. The quantity of air drawn in by the raw waste water jet will not always suffice to feed the waste water in the reaction chamber at all points with a sufficient quantity of oxygen. In order to remedy such a situation, according to the present invention, additional air is introduced into the reaction chamber through conduit 15 in the lower portion of the tower and through conduits 16 and 17 at different levels of the tower. The air feeding conduits extend to a certain extent into the reaction chamber. Inasmuch as only minor variations in pressure are involved, the air may be furnished by the compressed air reservoir 18 which, as mentioned above, is charged from time to time by the compressor 19.

In this way, the output of the tower will be considerably increased. There also exists the possibility to change an installation built according to FIG. 1 into an installation according to FIGS. 2 and 3 with the improved results inherent thereto.

In order to bring about an automatic regeneration of the prevailing microorganisms, it is advantageous to introduce nutrient substances or salts into the raw waste water conduit. This addition advantageously affects the purifying ability of the installation.

It is, of course, to be understood that the present invention is, by no means, limited to the particular constructions shown in the drawings but also comprises any modifications within the scope of the appended claims.

What I claim is:

1. An apparatus for fully biologically purifying domestic and industrial waste waters, which comprises: a tubular purifying tower filled with a filling substance selected from the group of porous granular substances consisting of lava slag and coke, said tower having its lower portion provided with inlet pipe means for admitting the waste water to be purified, said inlet pipe means being provided with a constriction, air inlet means arranged at said constriction for admitting air into said tower from the atmosphere in response to flow of water through said constriction, a compressed air reservoir, conduit means leading into said tower from said reservoir, said conduit means leading into said tower at different levels while at each level there are provided a plurality of said conduit means substantially evenly distributed over the circumference of said tower, and compressor means connected to said reservoir for charging the same.

2. An apparatus according to claim 1, in which said conduit means at the various levels are so arranged that the points where the conduit means lead into said tower at one level are offset with regard to the points where said conduit means of the adjacent level lead into said tower.

3. An apparatus for fully biologically purifying domestic and industrial waste waters containing detergents, which comprises a tubular purifying tower filled with a filling substance selected from the group of porous granular substances consisting of lava slag and coke, said tower having its lower portion provided with an inlet for the raw waste water to be purified, said inlet being arranged centrally of the tower, said tower having its upper portion provided with an outlet for discharging the purified water, inverted funnel means mounted on the upper portion of said tower for confining detergents foamed out from the water being purified in said tower, and discharge means communicating with said funnel means for withdrawing the said foamed out detergents.

4. An apparatus for fully biologically purifying domestic and industrial waste waters, which comprises a tubular purifying tower filled with a filling substance selected from the group of porous granular substances consisting of lava slag and coke, said tower having its lower portion provided with inlet pipe means for admitting the waste water to be purified, said inlet pipe means being provided with a nozzle-like constriction, an air pipe leading to the narrowest passage of said constriction for supplying air to said tower in response to flow of water through said constriction, pump means arranged near the lower portion of said purifying tower for pumping waste water through said constriction into the said tower, and return conduit means leading from the upper portion of said tower to the lower portion thereof near but above said constriction.

References Cited by the Examiner
UNITED STATES PATENTS

| | | | |
|---|---|---|---|
| 530,622 | 12/1894 | Scott-Moncrieff | 210—17 |
| 597,249 | 1/1898 | Smith | 210—169X |
| 1,189,114 | 6/1916 | Irwin | 210—203 |
| 1,991,896 | 2/1935 | Hays | 210—17 |
| 2,015,347 | 9/1935 | Luther et al. | 261—96X |
| 2,834,466 | 5/1958 | Hament | 261—95 X |
| 2,992,986 | 7/1961 | Ingram | 210—17 |

FOREIGN PATENTS

| | | |
|---|---|---|
| 446,066 | 4/1936 | Great Britain. |

OTHER REFERENCES

"American Sewerage Practice," vol. III, Disposal of Sewage, Metcalf, et al., Third ed., 1935, McGraw-Hill, New York, pp. 456–466.

MORRIS O. WOLK, *Primary Examiner.*